United States Patent

Ono

(10) Patent No.: US 8,159,597 B2
(45) Date of Patent: Apr. 17, 2012

(54) FOCUS CONTROL DEVICE AND FOCUS CONTROL METHOD

(75) Inventor: Hideharu Ono, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 338 days.

(21) Appl. No.: 12/500,743

(22) Filed: Jul. 10, 2009

(65) Prior Publication Data

US 2010/0123818 A1    May 20, 2010

(30) Foreign Application Priority Data

Nov. 17, 2008    (JP) .................................. 2008-293490

(51) Int. Cl.
*H04N 5/232* (2006.01)
*H04N 5/238* (2006.01)

(52) U.S. Cl. ......... 348/345; 348/326; 348/353; 348/365

(58) Field of Classification Search .................. 348/345, 348/353, 365
See application file for complete search history.

(56) References Cited

U.S. PATENT DOCUMENTS

| | | | | |
|---|---|---|---|---|
| 5,212,557 A | * | 5/1993 | Ueda ............................. | 348/347 |
| 6,552,748 B1 | * | 4/2003 | Sugimoto ...................... | 348/354 |
| 7,596,308 B2 | * | 9/2009 | Nakai ............................. | 396/101 |
| 7,773,145 B2 | * | 8/2010 | Yamaguchi .................... | 348/345 |
| 2004/0174456 A1 | * | 9/2004 | Kobayashi et al. ........... | 348/348 |
| 2007/0086767 A1 | | 4/2007 | Nakai | |
| 2008/0259172 A1 | * | 10/2008 | Tamaru ....................... | 348/218.1 |

FOREIGN PATENT DOCUMENTS

| | | |
|---|---|---|
| JP | 2005-122016 | 5/2005 |
| JP | 2007-108412 | 4/2007 |

* cited by examiner

*Primary Examiner* — Hung Lam

(74) *Attorney, Agent, or Firm* — Antonelli, Terry, Stout & Kraus, LLP.

(57) ABSTRACT

Even when a point light source is present in a subject or a normal subject is erroneously determined as a point light source in determination of the presence or absence of a point light source, the following is implemented: the driving time of a focus lens is shortened and quick focusing operation is provided. The optimum focus lens stroke is computed based on information on a high-brightness region and a low-brightness region in an image. Then the focus lens is driven while the focus lens stroke is continuously varied based on the amount of change in high-brightness region and low-brightness region.

5 Claims, 6 Drawing Sheets

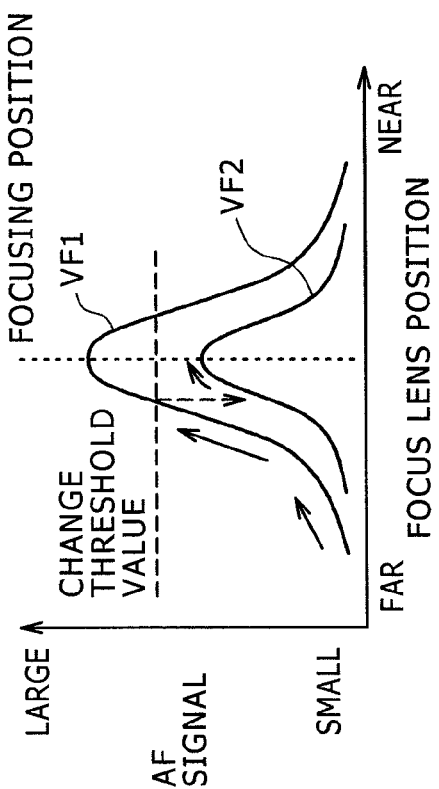
FIG.3A
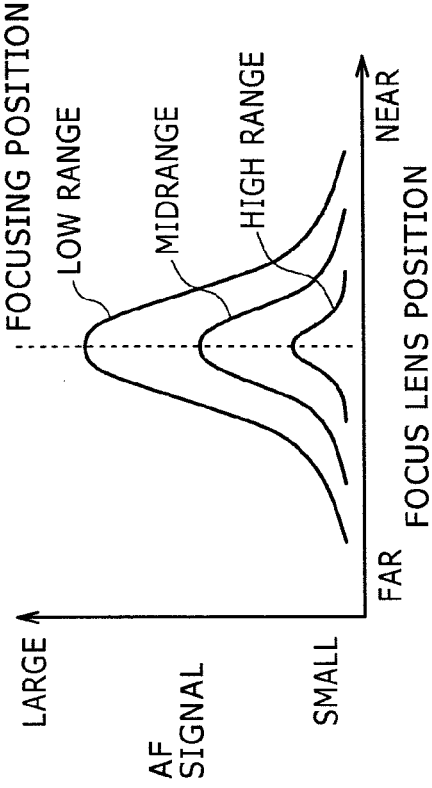

PIXEL COUNT DISTRIBUTION OBTAINED WHEN FOCUS IS ACHIEVED

PIXEL COUNT DISTRIBUTION OBTAINED WHEN IMAGE IS OUT OF FOCUS BECAUSE OF POINT LIGHT SOURCE

IMAGE OBTAINED WHEN FOCUS IS ACHIEVED

IMAGE OUT OF FOCUS BECAUSE OF POINT LIGHT SOURCE

CONVENTIONAL EXAMPLE

FOCUS STROKE PRESCRIPTION : EXAMPLE 1

FOCUS STROKE PRESCRIPTION : EXAMPLE 2

FOCUS CONTROL DEVICE AND FOCUS CONTROL METHOD

CLAIM OF PRIORITY

The present application claims priority from Japanese patent application serial no. JP 2008-293490, filed on Nov. 17, 2008, the content of which is hereby incorporated by reference into this application.

BACKGROUND OF THE INVENTION (1) Field of the Invention

The present invention relates to focus control devices and focus control methods and in particular to a focus control device and a focus control method wherein the driving time of a focus lens can be shortened to perform quick focusing operation.

(2) Description of the Related Art

Many image pickup devices including monitoring cameras (for prevention of crimes) and DVD (Digital Versatile Disc) cameras are equipped with an auto focus (hereafter, abbreviated as AF) function for automatically adjusting focus.

Various methods have been conventionally proposed and brought to practical use for auto focusing of image pickup devices. Among these methods, a contrast detection method in which a picture signal obtained through an image sensor is processed to detect a contrast signal in the picture signal is in wide use.

A high-frequency component of a picture signal existing in a contoured part or the like when an image of a subject is picked up is increased as it comes into focus. This is equivalent to increase in the difference in brightness level, that is, increase in contrast between a bright section and a dark section in the contoured part of the subject. The contrast detection method makes good use of this property and to bring a desired subject into focus, a focus lens only has to be controlled in a direction in which a high-frequency component of a picture signal is large.

This detection method is also designated as hill climbing method. This is because the following takes place when a focus lens is moved and a high-frequency component is extracted from a picture signal obtained at each lens position with HPF (High Pass Filter) to compute an AF evaluated value: such a chevron characteristic that the AF evaluated value in the proper focus position comes to the peak (the summit of a hill) is exhibited.

With HPF high in cutoff frequency, the stable peak value (a crest of AF evaluated value) of AF evaluated value can be obtained from a subject, such as a night scene, involving a point light source. In case of a subject low in contrast, the slope of the crest of AF evaluated value becomes gentle and it is difficult to obtain a proper point of focus (the lens position where the AF evaluated value comes to the peak). With HPF low in cutoff frequency, a crest of AF evaluated value can be obtained from a low-contrast subject. However, in case of a subject, such as a night scene, involving a point light source, a pseudo peak designated as pseudo crest is prone to occur and it is difficult to obtain a proper point of focus.

To cope with this, JP-A-2007-108412 discloses a technique. In this technique, the following processing is carried out when it is determined that both a high-brightness region and a low-brightness region exist in a focus area: a point light source is considered to exist and the setting of the cutoff frequency of HPF is changed from low to high to enhance focusing accuracy.

JP-A-2005-122016 discloses the following technique carried out with respect to such a subject as a night scene in which multiple point light sources are visible: an AF evaluated value is corrected according to the proportion of a high-brightness image occupying a picked-up field image and a focused focal point is identified based on the corrected AF evaluated value.

SUMMARY OF THE INVENTION

FIG. 1A to FIG. 1D are characteristic diagrams illustrating the relation between focus lens position and contrast signal (AF signal). Under normal subject conditions without a point light source, as illustrated in FIG. 1A, the cutoff frequency is set low and focusing is carried out by detecting the peak value of AF signal in a focusing position.

Under subject conditions involving a point light source, meanwhile, the following takes place because of the influence of the point light source when the cutoff frequency is set low as illustrated in FIG. 1B: the peak of a peripheral crest is higher than the peak of the crest at the proper point of focus as illustrated in Example 1 in FIG. 1B; or multiple crests are produced and there is no crest peak at the proper point of focus as illustrated in Example 2 in FIG. 1B. As a result, the lens is driven in a wrong direction and it may be impossible to achieve focus. In these cases, the cutoff frequency is set high as illustrated in FIG. 1C. Thus one steep chevron characteristic of AF signal can be obtained though the level of the chevron characteristic is reduced and focus can be often achieved.

However, a problem arises when the cutoff frequency is set high under normal subject conditions without a point light source. Such a chevron characteristic that the crest of AF signal is small and the slope of the crest is gentle as illustrated in FIG. 1D is obtained. This produces a situation in which the time it takes to achieve focus is lengthened or it is difficult to find a crest peak position and focus cannot be achieved at the proper point of focus.

As mentioned above, under subject conditions with the presence of a point light source, setting the cutoff frequency high is suitable for focusing; and under subject conditions without the presence of a point light source, setting the cutoff frequency low is suitable for focusing. However, it is difficult to recognize whether or not a point light source is contained in a subject.

As a technology for recognize whether or not a point light source is contained in a subject, there is known a technology in which the presence or absence of a point light source is determined using the following: information on a high-brightness region in an image pickup area, information on a low-brightness region in the area, or information obtained by combining these pieces of information. However, it is difficult to reliably determine that a point light source exists or a point light source does not exist.

For example, when it is determined that both a high-brightness region and a low-brightness region exist in a focus area, a point light source can be considered to exit and the cutoff frequency of HPF can be changed. In this case, there is a high possibility that a white subject (or a near white subject) is erroneously determined as a high-brightness region. This is because also under normal subject conditions, white subjects are close to the saturation level of a signal obtained by a camera picking up an image. Similarly, there is a high possibility that a black subject (or a near black subject) is erroneously determined as a low-brightness region for the same reason. When an erroneous determination is made, it may be impossible to set a cutoff frequency suitable for subject conditions and this may lead to a lengthened time it takes to achieve focus or the impossibility of focusing at worst.

To solve these problems, it is an object of the invention to provide a focus control device that controls the focus of an image pickup device for picking up an image of a subject. The focus control device is characterized in that it includes: a focus lens group that condenses light flux from the subject; a motor driver that drives this focus lens group in the direction of optical axis; an image sensor that receives light flux from the focus lens group and converts it from optical to electrical form and outputs it as an image signal; a contrast signal generation unit that extracts a high-frequency component of a luminance signal from the image signal to generate a contrast signal; a highlight signal generation unit that extracts a high-brightness region of a luminance signal from the image signal to generate a highlight signal; and an auto focus control unit that sets the range of driving of the focus lens group based on a highlight signal extracted at this highlight signal generation unit and controls the motor driver based on a contrast signal extracted at the contrast signal generation unit.

It is another object of the invention to provide a focus control method for controlling the focus of an image signal obtained by picking up an image. The focus control method includes the following steps: a focus adjustment step having a predetermined focus adjustment range; a contrast signal generation step of extracting a high-frequency component whose frequency is equal to or higher than a predetermined cutoff frequency from the image signal to generate a contrast signal; a highlight signal generation step of extracting a high-brightness region and a low-brightness region of a luminance signal from the image signal to generate a highlight signal; a first determination step of determining the presence or absence of a high-brightness region of the luminance signal using a highlight signal generated at this highlight signal generation step; and a second determination step of, when it is determined at the first determination step that a high-brightness region is present, determining the presence or absence of a low-brightness region of the luminance signal using a highlight signal generated at the highlight signal generation step. The focus control method is characterized in that the cutoff frequency for extracting the high-frequency component at the contrast signal generation step is set as follows: it is set highest when it is determined at the first determination step that a high-brightness region is present and it is determined at the second determination step that a low-brightness region is present; and it is set lowest when it is determined at the first determination step that a high-brightness region is absent. The focus control method is further characterized in that the focus adjustment range at the focus adjustment step is set as follows: it is set most narrowly when it is determined at the first determination step that a high-brightness region is present and it is determined at the second determination step that a low-brightness region is present; and it is set most widely when it is determined at the first determination step that a high-brightness region is absent.

The invention brings about the effect of a focus control device and a focus control method being realized. With these device and method, the driving time of a focus lens can be shortened to perform quick focusing operation and high-quality images can be provided to users even when, for example, a point light source exists or a normal subject is erroneously determined as a point light source.

BRIEF DESCRIPTION OF THE DRAWINGS

These and other features, objects, and advantages of the present invention will become more apparent from the following description when taken in conjunction with the accompanying drawings wherein:

FIG. 3A is an explanatory drawing of a cutoff frequency prescription table;

FIG. 3B is an explanatory drawing of AF signals;

FIG. 3C is an explanatory drawing of AF signals;

DETAILED DESCRIPTION OF THE EMBODIMENT

Hereafter, description will be given to an embodiment of the invention based on an example in which the invention is applied to a monitoring camera for prevention of crimes.

Figure 2:
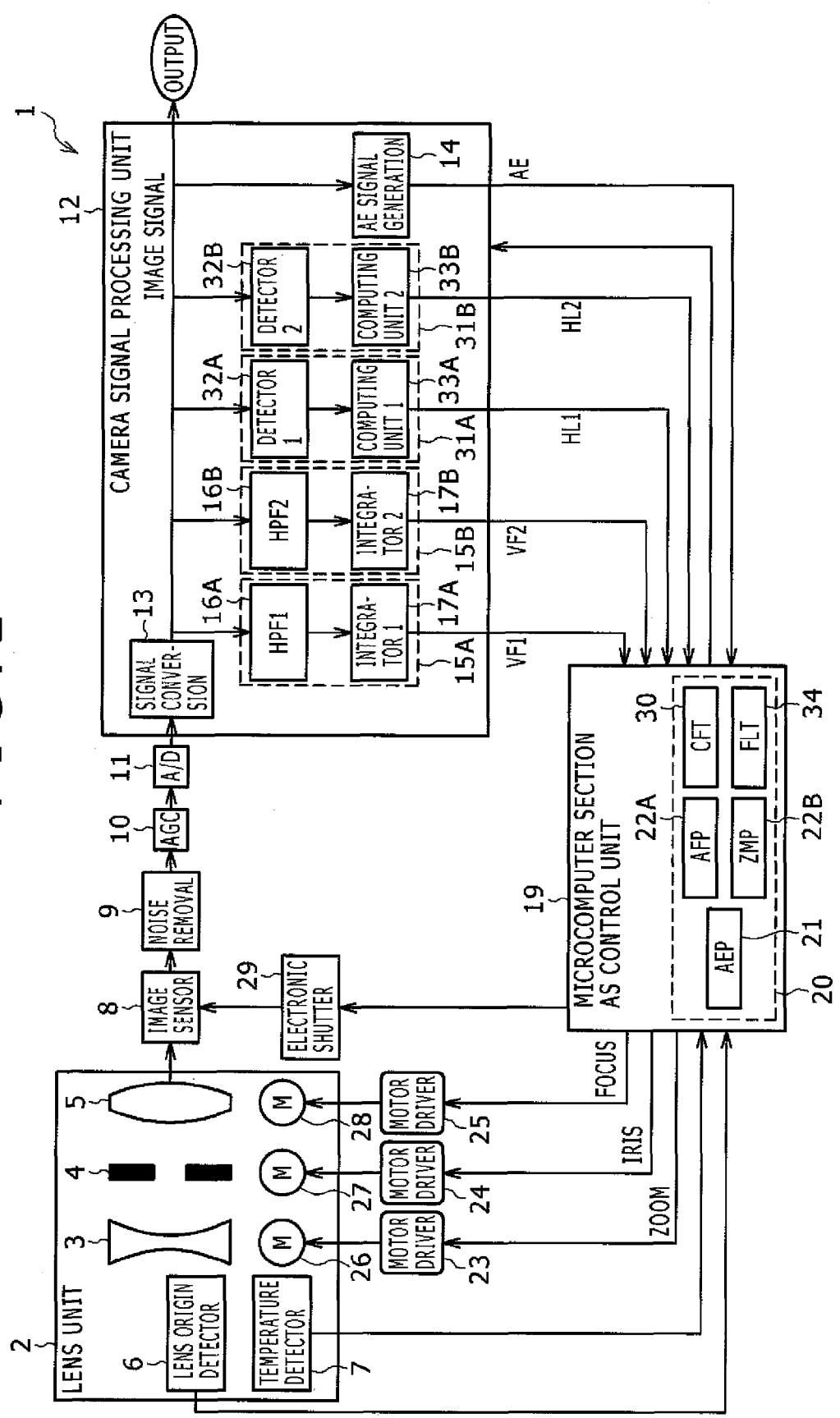
FIG. 2 is a block diagram illustrating the overall configuration of an image pickup device in an embodiment of the invention.

FIG. 2 is a block diagram illustrating the overall configuration of an image pickup device 1 in the embodiment of the invention. Description will be given to the operation of the entire device based on this block diagram.

In the image pickup device 1, a lens unit 2 includes: a zoom lens group 3 that variably magnifies light flux from a subject; an iris mechanism 4 for adjusting the amount of light received; and a focus lens group 5 that carries out focus adjustment. An optical image of the subject is formed on the light receiving surface of an image sensor 8.

In addition, the lens unit 2 is provided with a lens origin detector 6 comprised of, for example, a photointerruptor and the like and a temperature detector 7 comprised of a diode and the like. The lens origin detector 6 detects the lens origin positions of the zoom lens group 3 and the focus lens group 5 and transmits the result of detection as information on lens origin position for control to a control unit 19. Subsequently, a relative position is computed from signals supplied to motor drivers 23, 25 relative to this lens origin position information and driving of the zoom lens group 3 and the focus lens group 5 is controlled based on the position information.

The temperature detector 7 detects the temperature of the area in proximity to the lens unit 2 and transmits the result of detection as information on the temperature of the area in proximity to the lens unit 2 to the control unit 19. Based on this temperature information, control is carried out to correct the temperature at the point of focus of the focus lens group 5.

The image sensor 8 converts the optical image of the subject formed on the light receiving surface from optical to electrical form and sends an obtained imaging signal to a noise removal circuit 9. Thereafter, the imaging signal is subjected to predetermined noise removal processing at the noise removal circuit 9 and is amplified to the optimum level at an automatic gain controller (AGC) 10. It is converted to digital at an analog/digital conversion circuit (A/D circuit) 11 and then supplied as a digital imaging signal to a camera signal processing unit 12.

The camera signal processing unit 12 carries out predetermined signal processing on the supplied digital imaging signal at a signal conversion circuit 13. It thereby converts the digital imaging signal to a standard television signal (image signal) in conformity with a predetermined television system, such as the NTSC (National Television Standards Committee) standard and the PAL (Phase Alternating Line) standard, and outputs the signal to the outside. In addition, the camera signal processing unit 12 generates an auto iris signal (AE signal) at an auto iris signal generation circuit 14 based on this television signal and sends it out to the control unit 19. The signal level of this AE signal corresponds to the present brightness of the picked-up image, the opening of the iris mechanism 4 of the lens unit 2, a gain for automatic gain control, and the like.

Further, the camera signal processing unit 12 is provided with: a first contrast signal generation unit 15A comprised of a first HPF circuit 16A and a first integrator 17A; and a second contrast signal generation unit 15B comprised of a second HPF circuit 16B and a second integrator 17B. One of the features of the invention is that: the set values of cutoff frequency of the first and second HPF circuits 16A, 16B can be selected according to subject conditions. Examples of the subject conditions include determination conditions for the presence or absence of a point light source, the presence or absence of a high-brightness/low-brightness region, or the like.

Description will be given to cutoff frequency and contrast signal (AF signal) with reference to FIG. 3A to FIG. 3C.

In this embodiment, set values in the cutoff frequency prescription table 30 illustrated in FIG. 3A are used. Contrast signal VF1 represents an output signal of the first contrast signal generation unit 15A and VF2 represents an output signal of the second contrast signal generation unit 15B. The cutoff frequency of the first HPF 16A in the first contrast signal generation unit 15A is set as follows: it is set low (low range) when a point light source is absent; it is set high (high range) when a point light source is present and both a high-brightness region and a low-brightness region are present; and it is set to between both ranges (midrange) when a point light source is present and only a high-brightness region is present. The cutoff frequency of the second HPF 16B in the second contrast signal generation unit 15B is set as follows: it is set high (high range) regardless of the presence of a high-brightness region or a low-brightness region when a point light source is present; and it is set slightly low (midrange) when a point light source is absent. In the cutoff frequency prescription table 30, there are three boxes in which the words of high range are written; however, it does not mean that they are an identical cutoff frequency. This is the same with the two boxes in which the word of midrange is written.

As indicated by the chevron characteristic (example) of AF signal versus focus lens position in FIG. 3B, the AF signal exhibits the following characteristic: when the cutoff frequency is high (high range), the signal level is low and the peak of the crest is gentle; and as the cutoff frequency is lowered, the signal level is increased and the peak of the crest becomes steeper.

FIG. 3C will be described later. Description will be back to FIG. 2.

The camera signal processing unit 12 in FIG. 2 extracts a high-frequency component of a luminance signal of a television signal, generated by the signal conversion circuit 13, through the first HPF circuit 16A. It integrates this high-frequency component at the first integrator 17A and thereby generates a first contrast signal VF1. In addition, the camera signal processing unit 12 extracts a high-frequency component of this luminance signal through the second HPF circuit 16B. It integrates this high-frequency component at the second integrator 17B and thereby generates a second contrast signal VF2.

Figure 1B:
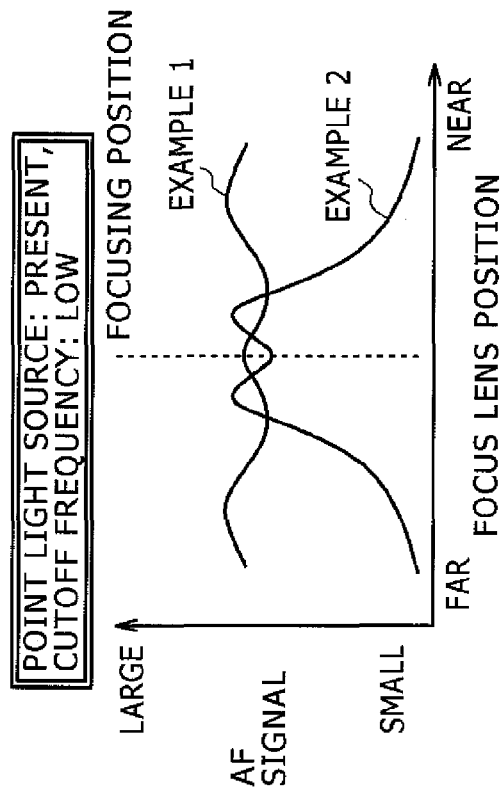
FIGS. 1A to 1D are characteristics diagram illustrating the relation between focus lens position and AF signal.
Figure 1C:
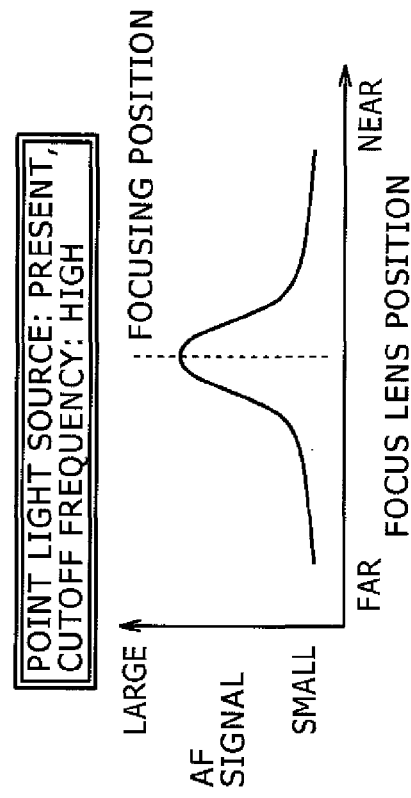
Figure 1A:
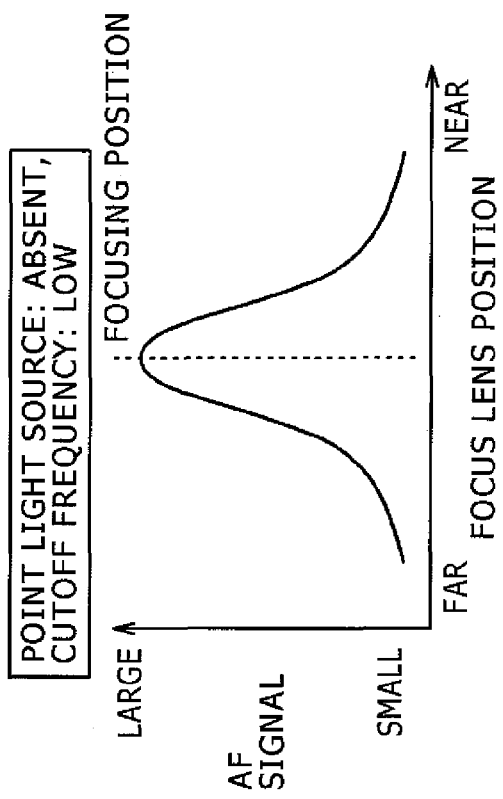
Figure 1D:
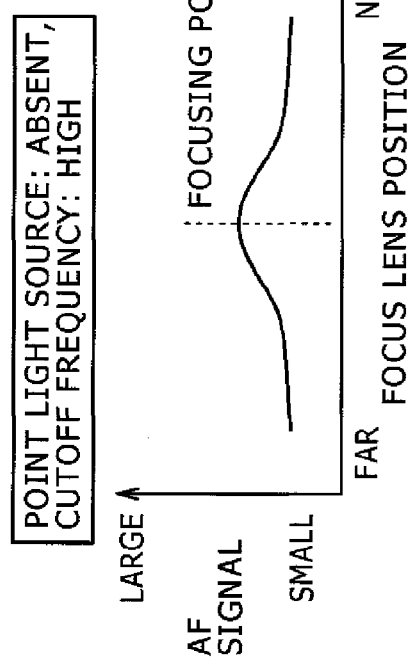

As illustrated in FIG. 1A, the following takes place under normal subject conditions without a point light source: a common contrast signal with low cutoff frequency setting exhibits a steep chevron characteristic at the proper point of focus when the horizontal axis is taken for focus lens position. The camera signal processing unit 12 sends the thus obtained first and second contrast signals VF1, VF2 to the control unit 19. Under this subject conditions, the second HPF circuit 16B is so set that the cutoff frequency thereof is higher (midrange in FIG. 3A) than that of the first HPF circuit 16A.

Further, the camera signal processing unit 12 is provided with: a first highlight signal generation unit 31A comprised of a first highlight detector 32A and a first computing unit 33A; and a second highlight signal generation unit 31B comprised of a second highlight detector 32B and a second computing unit 33B.

Figure 4B:
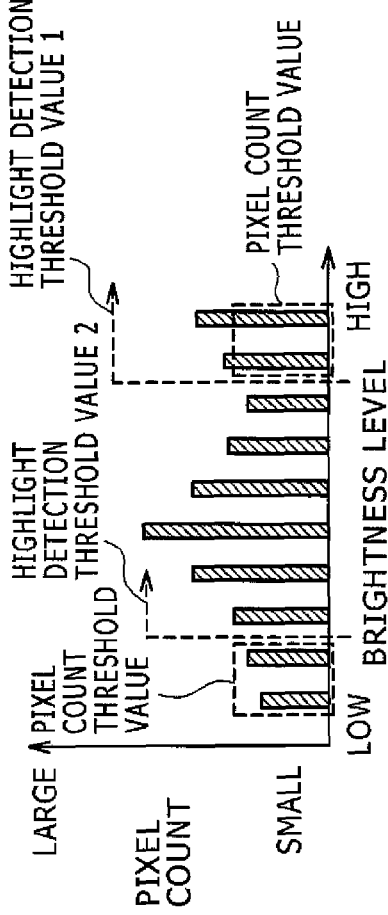
FIG. 4B is an explanatory drawing of a pixel count distribution.
Figure 4D:
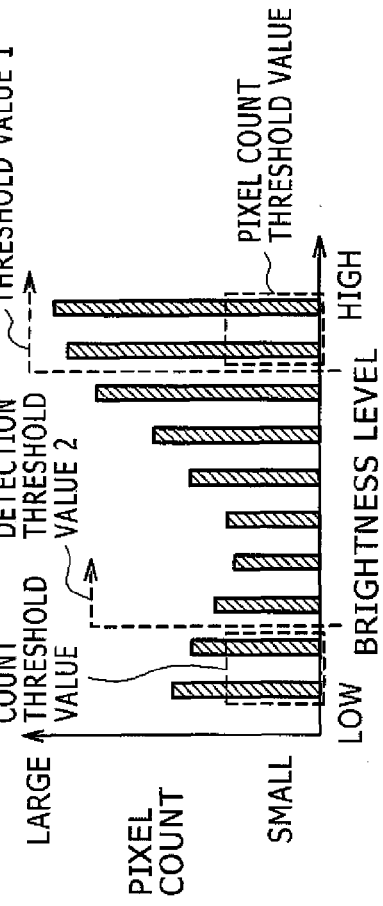
FIG. 4D is an explanatory drawing of a pixel count distribution.
Figure 4A:
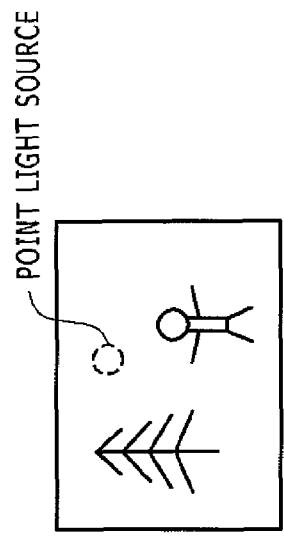
FIG. 4A is an explanatory drawing of an image obtained when a point light source exists.
Figure 4C:
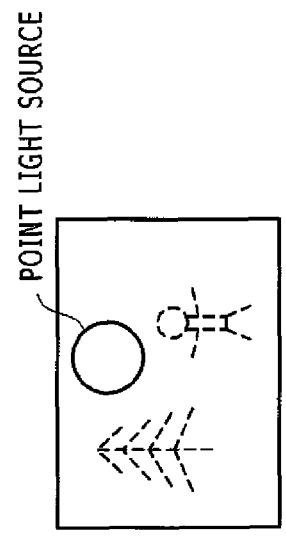
FIG. 4C is an explanatory drawing of an image obtained when a point light source exists.

Description will be given to images obtained when a point light source is present and pixel count distribution with reference to FIG. 4A to FIG. 4D. FIG. 4A illustrates a case where a subject indicated by solid line is brought into focus and the point light source is not brought into focus. FIG. 4B illustrates the distribution of pixel counts at each brightness level with respect to the pixels of the image sensor 8. FIG. 4C illustrates a case where a point light source is brought into focus and a subject indicated by broken line is not brought into focus. FIG. 4D illustrates the distribution of pixel counts at each brightness level with respect to the pixels of the image sensor 8. In general, it is desirable that focus should be achieved as illustrated in FIG. 4A.

As illustrated in FIG. 4B and FIG. 4D, the highlight signal generation units are set as follows: the highlight detection threshold value 1 of the first highlight signal generation unit 31A is set high so that a high-brightness region can be detected; and the highlight detection threshold value 2 of the second highlight signal generation unit 31B is set low so that a low-brightness region can be detected. The first and second highlight detectors 32A, 32B are so constructed that the highlight detection threshold value 1 and the highlight detection threshold value 2 can be freely changed to the extent that the relation of the detection threshold value 1>the detection threshold value 2 holds.

The camera signal processing unit 12 extracts the count of high-brightness pixels whose level is higher than the highlight detection threshold value 1 of a luminance signal in a television signal (image signal) generated by the signal conversion circuit 13 through the highlight detector 32A. It integrates this pixel count at the first computing unit 33A and thereby generates a first highlight detection signal HL1. The camera signal processing unit 12 similarly extracts the count of high-brightness pixels whose level is higher than the highlight detection threshold value 2 of this luminance signal through the highlight detector 32B. Subsequently, it subtracts these counts from the count of all the pixels at the second computing unit 33B and thereby extracts the count of low-brightness pixels. Further, it integrates it at the second computing unit 33B and thereby generates a second highlight detection signal HL2. The camera signal processing unit 12 sends the thus obtained first and second highlight detection signals HL1, HL2 out to the control unit 19. Needless to add, the second highlight detection signal HL2 may be generated by directly extracting the count of low-brightness pixels whose level is lower than the highlight detection threshold value 2 of the luminance signal and integrating it at the second computing unit 33B.

One of the features of this embodiment is that a desired subject is brought into focus, even though a point light source is present, by using the following detection signals: the highlight detection signal HL1 related to the count of high-brightness pixels whose brightness level is higher than the highlight detection threshold value 1; and the highlight detection signal HL2 related to the count of low-brightness pixels whose brightness level is lower than the highlight detection threshold value 2. This will be described later in more detail and description will be first given to a control method pertaining to the control unit 19 in FIG. 2.

The control unit 19 is comprised of information processing units, including CPU (Central Processing Unit) and an internal memory 20. The control unit 19 computes an auto iris evaluated value, acquires an auto focus evaluated value, and processes them based on an auto iris data processing program (AEP) 21 and an auto focus data processing program (AFP) 22A stored in the internal memory 20. The auto iris evaluated value is an evaluated value with respect to the present brightness of the picked-up image recognized by an auto iris signal (AE signal), the opening of the iris mechanism 4 of the lens unit 2, the gain of the automatic gain controller 10, and the like. The auto focus evaluated value is the value of a first or second contrast signal VF1, VF2.

At this time, the control unit 19 carries out the following processing as illustrated in the AF signal change (example) in FIG. 3C. When it determines that the focus lens group 5 of the lens unit 2 is away from the focusing position by a predetermined distance or more, the control unit acquires an auto focus evaluated value based on the first contrast signal VF1. (That is, when the signal level of contrast signal VF1 is smaller than the change threshold value in the drawing, the control unit acquires the auto focus evaluated value.) Then it performs hill climbing operation in the direction in which the signal level of the contrast signal VF1 is increased. Meanwhile, when it determines that the focus lens group 5 is positioned within the predetermined distance from the focusing position, the control unit acquires an auto focus evaluated value based on the second contrast signal VF2. (That is, when the signal level of the contrast signal VF1 is larger than the change threshold value, the control unit acquires the auto focus evaluated value.) Then it performs hill climbing operation in the direction in which the signal level of the contrast signal VF2 is increased. That is, the first contrast signal VF1 is used for coarse adjustment in auto focus control and the second contrast signal VF2 is used for fine adjustment in auto focus control.

Then the control unit 19 detects a focusing direction and a focusing position based on the auto focus evaluated value, and it generates a third motor control signal based on the result of detection and sends this out to the third motor driver 25. The third motor driver 25 controls driving of a third motor 28 that moves the focus lens group 5 of the lens unit 2 in the direction of the optical axis thereof, based on the third motor control signal. As a result, auto focus control is carried out.

In addition, the control unit 19 generates first and second motor control signals based on the following: zoom magnification information indicating the present zoom magnification obtained by a zoom trace data processing program 22B based on the auto iris evaluated value and lens absolute position information from the lens origin detector 6 of the lens unit 2; lens unit internal temperature information supplied from the temperature detector 7 of the lens unit 2; and trace curve data stored in the internal memory 20. Then the control unit respectively sends these signals to the first and second motor drivers 23, 24. Then the first motor driver 23 controls driving of the first motor 26 that moves the zoom lens group 3 of the lens unit 2 in the direction of the optical axis thereof, based on the first motor control signal. As a result, zoom control is carried out. The second motor driver 24 controls driving of the second motor 27 that drives the aperture of the lens unit 2, based on the second motor control signal. As a result, auto iris control is carried out.

The zoom lens group 3 is controlled based on a signal from a zoom button or a control command from a personal computer and the focus lens group 5 is controlled based on trace curve data or temperature information.

Further, the control unit 19 controls the shutter speed of an electronic shutter 29 so as to increase or decrease the time of exposure for the image sensor 8 based on this auto iris evaluated value. It thereby adjusts the amount of light of an optical image of the subject formed on the light receiving surface of the image sensor 8 and further adjusts the gain of the automatic gain controller 10 based on the auto iris evaluated value.

One of the features of this embodiment is that quick focusing is carried out by varying a focus stroke based on information on change in a high-brightness pixel area and a low-brightness pixel area.

This will be described using again examples of pixel count distribution ranging from high brightness to low brightness in FIG. 4B and FIG. 4D.

Under normal subject conditions, the proportion of high-brightness pixels or low-brightness pixels occupying the whole is not large and the count of intermediate-brightness pixels accounts for a large percentage. Under subject conditions with a point light source, meanwhile, the proportion of high-brightness pixels is increased. However, when the subject indicated by solid line is brought into focus as illustrated in FIG. 4A and the point light source is out of focus, significant increase does not occur. At this time, the proportion of low-brightness pixels is not significantly increased, either.

However, when the point light source is brought into focus and the intended subject is brought out of focus as illustrated in FIG. 4C, the following takes place: the apparent size of the point light source is increased and thus the proportion of high-brightness pixels is significantly increased. In conjunction with increase in the proportion of high brightness occupying the picture, exposure control acts to match the brightness of the high-brightness portion with the optimum value and the area surrounding the point light source is darkened. For this reason, the proportion of low-brightness pixels also tends to increase.

With the above-mentioned characteristic under subject conditions with a point light source taken into account, the following measure is taken: first, the highlight detection threshold value 1 of the first highlight signal generation unit 31A is set to such a slightly high brightness level that the point light source can be detected as high-brightness pixels at the time of focusing. As a result, high-brightness pixels higher in brightness than the highlight detection threshold value 1 are detected at the first highlight detector 32A and the number of the pixels is integrated at the first computing unit 33A to generate the first highlight detection signal HL1. Therefore, when the size of a point light source is increased, the level of the highlight detection signal HL1 is increased; and when the size of the point light source is reduced, the level of the highlight detection signal HL1 is also reduced.

Similarly, the highlight detection threshold value 2 of the second highlight signal generation unit 31B is set to such a slightly low brightness level that the following can be implemented: under subject conditions with a point light source, pixels with a nearby subject marked out in black by the influence of the point light source can be detected. As a result, low-brightness pixels lower in brightness than the highlight detection threshold value 2 are detected at the second highlight detector 32B and the number of the pixels is integrated at the second computing unit 33B to generate the second highlight detection signal HL2. Therefore, when the influence of a point light source is increased, the level of the highlight detection signal HL2 is increased; and when the influence of the point light source is reduced, the level of the highlight detection signal HL2 is also reduced.

The camera signal processing unit 12 sends the thus obtained first and second highlight detection signals HL1, HL2 to the control unit 19.

The control unit 19 computes the amount of change in each of the first and second highlight detection signals HL1, HL2 and computes the optimum focus stroke based on the results of computation. In addition, it sets the above-mentioned cutoff frequencies for the first and second contrast signals VF1, VF2.

This processing will be described with reference to a flowchart.

Figure 5:
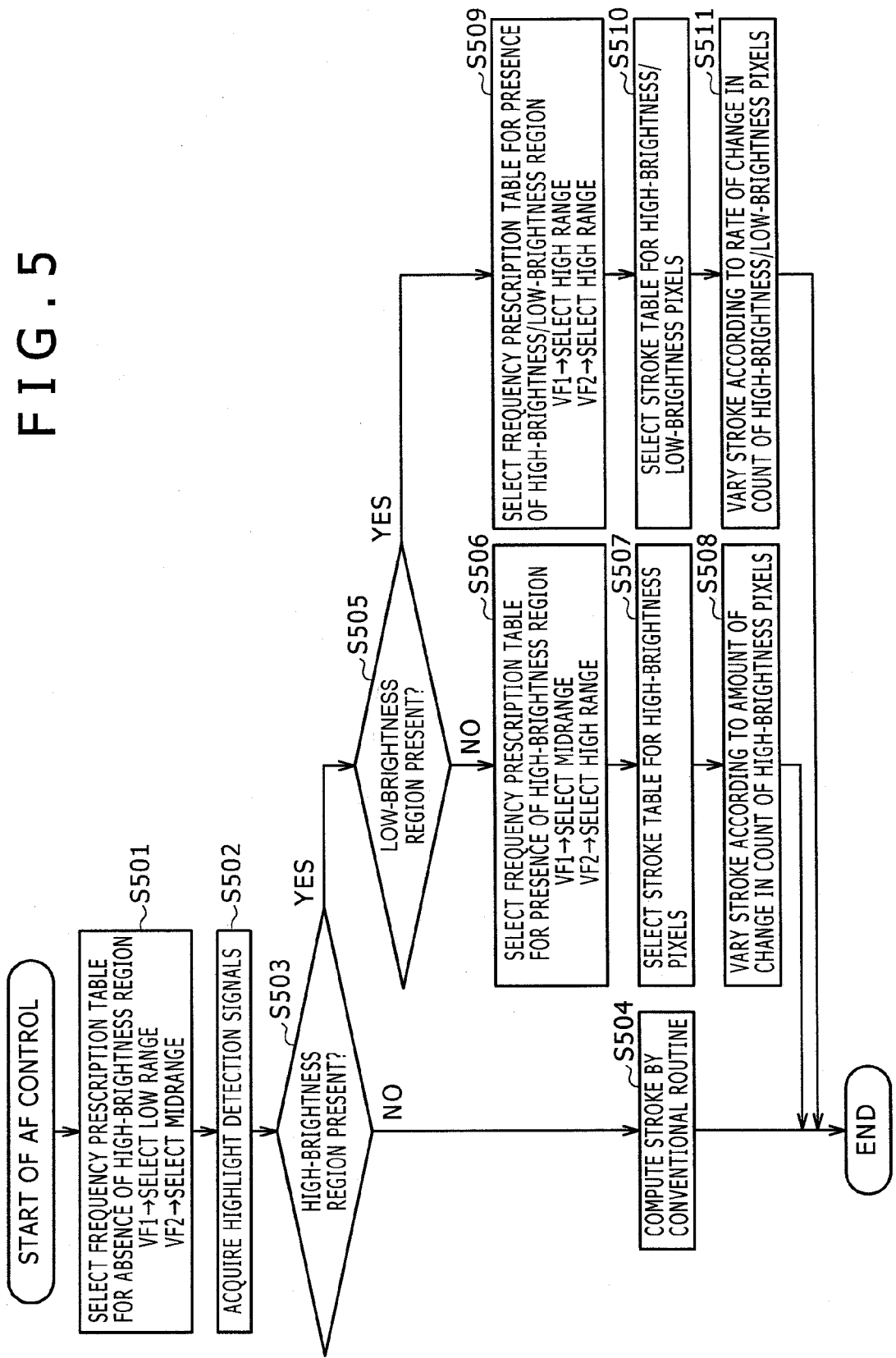
FIG. 5 is a flowchart of auto focus control in the embodiment of the invention.

FIG. 5 is a flowchart of auto focus control in an embodiment of the invention. Description will be given based on this flowchart.

At Step S501, first, the cutoff frequencies of the first HPF circuit 16A and the second HPF circuit 16B are set. As the initial value, a relatively low cutoff frequency applied when it was determined that a point light source was absent is used. A table for the absence of a high-brightness region is selected from among the cutoff frequency prescription tables 30 in FIG. 2 and FIG. 3A. Then the cutoff frequency of the first HPF circuit 16A related to the contrast signal VF1 is set to low range and the cutoff frequency of the second HPF circuit 16B related to the contrast signal VF2 is set to midrange.

At Step S502, the control unit 19 acquires the first and second highlight detection signals HL1, HL2.

At Step S503, it is determined whether or not the first highlight detection signal HL1 exceeds a predetermined first pixel count threshold value to determine whether a high-brightness region is present or absent. When the threshold value is not exceeded (NO at S503), it is determined that a high-brightness region is absent, that is, a point light source is not contained in the subject. At Step S504, in this case, a focus stroke is computed by conventional routine. Since the cutoff frequencies of the HPF circuits set at Step S501 can be used without change, the flow is terminated.

Figure 6A:
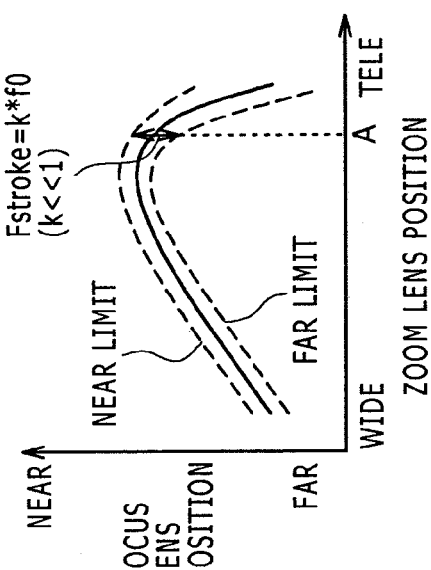
FIGS. 6A to 6C are characteristics diagram illustrating the relation between zoom lens position and focus lens stroke.
Figure 6B:
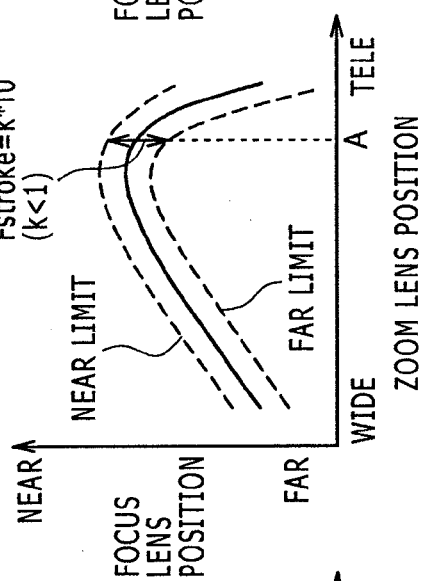
Figure 6C:
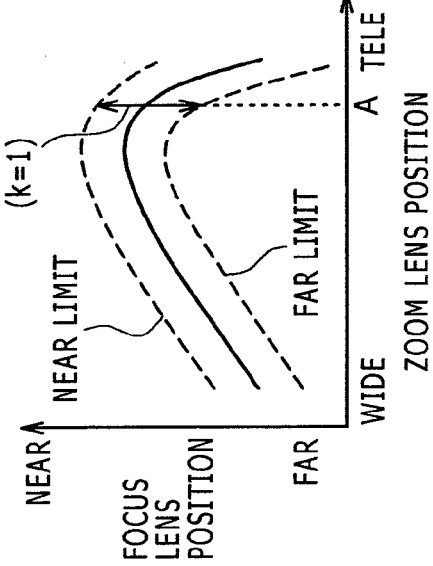

Description will be continued with a focus on the position of the zoom lens 3 between the wide angle shot side and the telescopic shot side and the position of the focus lens 5 with reference to FIG. 6A to FIG. 6C. FIG. 6A to FIG. 6C are characteristic diagrams illustrating the relation between zoom lens position and focus lens stroke. FIG. 6A illustrates a case where it is determined that a point light source is absent. Letting the distance between the NEAR limit and the FAR limit in a certain position A of the zoom lens, that is, the focus stroke be Fstroke, the following expression is obtained:

$$F\text{stroke}(A)=f0 \quad \text{(Expression 1)}$$

In the conventional routine, the novel variable control of the focus stroke described in relation to the invention is not carried out. Therefore, when the focus stroke is expressed like the following expression, k=1.

$$F\text{stroke}(A)=k*f0 \quad \text{(Expression 2)}$$

That is, a certain predetermined focus stroke is set according to the position of the zoom lens.

When it is determined at Step S503 in FIG. 5 that the first highlight detection signal HL1 exceeds the pixel count threshold value (YES at S503), it is determined that a high-brightness region is present, that is, a point light source is contained in the subject. At Step S505, in this case, it is determined whether or not the second highlight detection signal HL2 exceeds a predetermined second pixel count threshold value. When the threshold value is not exceeded (NO at S505), it is determined that a low-brightness region is absent, that is, only a high-brightness region is present. In this case, it can be determined that a point light source is present in the subject but there is a high possibility that the focus lens position is located in proximity to a relatively proper focused focal point.

At Step S506, the cutoff frequencies of the first HPF circuit 16A and the second HPF circuit 16B are set. When is determined that a point light source is present but the focus lens position is located in proximity to a relatively proper focused focal point, relatively high cutoff frequency setting is effective. Therefore, a table for the presence of a high-brightness region is selected from among the cutoff frequency prescription tables 30 in FIG. 2 and FIG. 3A. Then the contrast signal VF1 is set to midrange and the contrast signal VF2 is set to high range.

At Step S507, subsequently, a stroke table for high-brightness pixels is selected from among the focus stroke prescription tables 34 in FIG. 2. Letting the selected focus stroke be Fstroke, the following expression is similarly obtained:

$$F\text{stroke}(A)=k*f0 \quad \text{(Expression 2)}$$

In this case, however, k<1. That is, a focus stroke narrower than the focus stroke set by the conventional routine as illustrated in FIG. 6B is taken as a basis.

At Step S508, the stroke is varied using the amount of change in high-brightness region (that is, change in the count of high-brightness pixels) ΔHpixel and the flow is terminated. It is advisable to compute the focus stroke based on the following computational expression:

$$F\text{stroke}(A)=k*f0/\Delta H\text{pixel} \ (k<1) \quad \text{(Expression 3)}$$

More specific description will be given. When the amount of change in high-brightness region is large, there are a high possibility that out-of-focus has occurred due to the influence of a point light source. Therefore, it is desirable to set a narrow focus stroke. In (Expression 3), Fstroke(A) is inversely proportional to ΔHpixel but this is just an example. Any other method may be adopted to the extent that Fstroke(A) is reduced with increase in ΔHpixel.

In a stroke table in the focus stroke prescription tables 34, Fstroke(A) may be defined as:

$$F\text{stroke}(A)=k*f1/\Delta H\text{pixel} \quad \text{(Expression 4)}$$

and the relation k=1 may be maintained. That is, f1 may be taken as a function and a reference table for NEAR limit/FAR limit corresponding to zoom lens position may be set based on another correlation.

When at Step S505 the second highlight detection signal HL2 exceeds the pixel count threshold value (YES at S505), the following can be determined: a low-brightness region is present, that is, a point light source is present in the subject; and in addition, there is a high possibility that the following has occurred: the proportion of a point light source occupying the picture is large (for example, there are a large number of point light sources); or the focus lens position is located away from the proper focusing position due to the influence of a point light source (out-of-focus has occurred in the picture). In this case, there is a high possibility that the chevron characteristic of auto focus evaluated value takes an unusual crest shape, for example, a pseudo crest is produced.

At Step S509, subsequently, the cutoff frequencies of the first HPF circuit 16A and the second HPF circuit 16B are set. When a point light source is present and in addition it is determined that it has a very profound effect, higher cutoff frequency setting is effective. Therefore, a table for high-brightness/low-brightness pixels is selected from among the cutoff frequency prescription tables 30 in FIG. 2 and FIG. 3A. Then both the contrast signal VF1 and the contrast signal VF2 are set to high range. At this time, a set value for higher range may be provided in a cutoff frequency prescription table 30 and the contrast signal VF2 may be set to that value.

At Step S510, subsequently, a stroke table for high-brightness/low-brightness pixels is selected from among the focus stroke prescription tables 34 in FIG. 2. Letting the selected focus stroke be Fstroke, the following expression is similarly obtained:

$$F\text{stroke}(A)=k*f0 \quad \text{(Expression 2)}$$

In this case, however, k<<1. A focus stroke narrower than the focus stroke set in the example in FIG. 6B is obtained as illustrated in FIG. 6C.

At Step S511, subsequently, the stroke is varied using the amount of change $\Delta HL$pixel with both the high-brightness region and the low-brightness region taken into account and the flow is terminated. It is advisable to compute the focus stroke based on the following computational expression:

$$F\text{stroke}(A)=k*f0/\Delta HL\text{pixel} \ (k<<1) \quad \text{(Expression 5)}$$

At this time, letting the amount of change in low-brightness region be $\Delta L$pixel, the following expression is obtained:

$$\Delta HL\text{pixel}=\Delta H\text{pixel}+\Delta L\text{pixel} \quad \text{(Expression 6)}$$

That is, when not only the amount of change in high-brightness region but also the amount of change in low-brightness region is large, there is a higher possibility that out-of-focus has occurred due to a point light source. Therefore, it is desirable to set a narrower focus stroke.

In a stroke table in the focus stroke prescription tables 34, the following measure may be taken: Fstroke (A) is defined as:

$$F\text{stroke}(A)=k*f2/\Delta HL\text{pixel} \quad \text{(Expression 7)}$$

and f2 is taken as a function and a different table of correlation is set, and the relation k=1 may be maintained. The amount of change with both the high-brightness region and the low-brightness region taken into account may be acquired as the ratio of them based on the following expression:

$$\Delta HL\text{pixel}=\Delta H\text{pixel}/\Delta L\text{pixel} \quad \text{(Expression 8)}$$

The computation method may be changed according to, for example, the amount of change in high-brightness region or the amount of change in low-brightness region.

Based on the result of the above computation, the cutoff frequencies of the HPF circuits are set and the focus stroke is set. This makes it possible to quickly bring an intended subject into focus.

The control unit 19 detects the focusing direction and the focusing position based on an auto focus evaluated value. Further, it generates a third motor control signal based on the result of detection and sends this signal to the third motor driver 25. Thus the third motor driver 25 controls driving of the third motor 28 that moves the focus lens group 5 of the lens unit 2 in the direction of the optical axis thereof, based on the third motor control signal and the focus lens group approaches the proper point of focus.

If the end point for control is reached before the focusing direction and the focusing position are detected based on the auto focus evaluated value at this time, the control unit 19 carries out the following processing: it generates a third motor control signal for inverting the driving direction based on the result of detection and sends this signal out to the third motor driver 25. Therefore, the focus lens group starts to move to the proper point of focus.

In the above-mentioned embodiment, when it is detected that the first highlight detection signal HL1 exceeds the pixel count threshold value, that is, it is determined that a point light source is present in the subject, determination by the second highlight detection signal HL2 is carried out. Instead of this determination, the following processing may be carried out: a stroke table for high-brightness pixels is selected from among the focus stroke prescription tables 34 and a focus stroke is computed according to the amount of change in high-brightness region (that is, change in the count of high-brightness pixels). Alternatively, the following processing may be carried out: the table is changed from a stroke table for high-brightness pixels to a stroke table for high-brightness/low-brightness pixels according to the amount of change in high-brightness region; and a focus stroke is computed according to the amount of change in high-brightness region again.

The above-mentioned embodiment may be modified so that the following processing is carried out: information on zoom lens position is added to information in a stroke table selected from among the focus stroke prescription tables 34 and information on the amount of change in high-brightness/low-brightness region; and a focus stroke is computed so that it is further varied according to the zoom lens position.

$$F\text{stroke}(A)=k*f0/\Delta HL\text{pixel} \quad \text{(Expression 9)}$$

In the above-mentioned embodiment, a focus stroke is computed based on the following information: information in a stroke table selected from among the focus stroke prescription tables 34 and information on the amount of change in high-brightness/low-brightness region. Instead, the following measure may be taken: driving speed is computed and control is carried out while the focus lens driving speed is varied.

$$F\text{speed}(A)=K1spd*f0/\Delta HL\text{pixel} \quad \text{(Expression 10)}$$

where, K1spd is an arbitrary coefficient for computing driving speed; and Fspeed is focus lens driving speed.

In the above-mentioned embodiment, a focus stroke is computed based on the following information when zoom lens driving involving auto focus control is carried out: information in a stroke table selected from among the focus stroke prescription tables 34 and information on the amount of change in high-brightness/low-brightness region. Instead, the following measure may be taken: zoom lens driving speed is computed and, for example, when zooming is carried out from the wide angle shot side to the telescopic shot side, control is carried out to reduce zoom lens driving speed.

$$Z\text{speed}(A)=K2spd*f0/\Delta HL\text{pixel} \quad \text{(Expression 11)}$$

where, K2spd is an arbitrary coefficient for computing driving speed; and Zspeed is zoom lens driving speed.

As described up to this point, the optimum focus lens stroke is computed based on information on the proportions of high-brightness region and low-brightness region and the focus lens stroke is continuously varied according to the amount of change in high-brightness region and low-brightness region. Therefore, even when a point light source is present or a normal subject is erroneously determined as a point light source, it is possible to shorten the driving time of a focus lens and carry out quick focusing.

Up to this point, description has been given to an embodiment of the invention; however, this embodiment is just an example and does not limit the invention. In addition, there are various possible modifications to a method for bringing an intended subject into focus without the influence of a point light source and any of these modifications is within the scope of the invention.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. A focus control device controlling the focus of an image pickup device for picking up an image of a subject, comprising:
    A focus lens group condensing light flux from the subject;
    a motor driver driving this focus lens group in the direction of optical axis;
    an image sensor receiving light flux from the focus lens group, converting the light flux from optical to electrical form, and outputting the same as an image signal;
    a contrast signal generation unit extracting a high-frequency component of a luminance signal from the image signal to generate a contrast signal;
    a highlight signal generation unit extracting a high-brightness region of a luminance signal from the image signal to generate a highlight signal; and
    an auto focus control unit setting the stroke of the focus lens group based on a highlight signal extracted at this highlight signal generation unit and controlling the motor driver based on a contrast signal extracted at the contrast signal generation unit.

2. The focus control device according to claim 1,
    wherein the contrast signal generation unit extracts a first contrast signal obtained through HPF of a first cutoff frequency and a second contrast signal obtained through HPF of a second cutoff frequency higher than the first cutoff frequency, and
    wherein the auto focus control unit carries out auto focus control based on the first contrast signal first and, when the magnitude of the first contrast signal exceeds a predetermined value, carries out auto focus control based on the second contrast signal.

3. The focus control device according to claim 1,
    wherein when the highlight signal indicates that a high-brightness region is present in the luminance signal, the contrast signal generation unit sets the cutoff frequency of HPF extracting a high-frequency component higher than when it is indicated that a high-brightness region is absent.

4. The focus control device according to claim 1,
    wherein when the highlight signal indicates that a high-brightness region is present in the luminance signal, the auto focus control unit sets the stroke of the focus lens group more narrowly than when it is indicated that a high-brightness region is absent.

5. A focus control method for controlling the focus of an image signal obtained when an image is picked up, comprising:
    a focus adjustment step involving a predetermined focus adjustment range;
    a contrast signal generation step of extracting a high-frequency component equal to or higher than a predetermined cutoff frequency from the image signal to generate a contrast signal;
    a highlight signal generation step of extracting a high-brightness region and a low-brightness region of a luminance signal from the image signal to generate a highlight signal;
    a first determination step of determining the presence or absence of a high-brightness region of the luminance signal using a highlight signal generated at this highlight signal generation step; and
    a second determination step of, when it is determined as the result of determination at the first determination step that a high-brightness region is present, determining the presence or absence of a low-brightness region of the luminance signal using a highlight signal generated at the highlight signal generation step,
    wherein the cutoff frequency for extracting the high-frequency component at the contrast signal generation step is set highest when it is determined at the first determination step that a high-brightness region is present and it is determined at the second determination step that a low-brightness region is present and is set lowest when it is determined at the first determination step that a high-brightness region is absent, and wherein the focus adjustment range at the focus adjustment step is set most narrowly when it is determined at the first determination step that a high-brightness region is present and it is determined at the second determination step that a low-brightness region is present and is set most widely when it is determined at the first determination step that a high-brightness region is absent.

* * * * *